United States Patent
Marquez

(10) Patent No.: US 9,193,415 B1
(45) Date of Patent: Nov. 24, 2015

(54) TRICYCLE APPARATUS WITH REAR INDEPENDENT TRANSVERSE SUSPENSION AND RELATED COMPONENTS

(71) Applicant: Arnold Marquez, Seattle, WA (US)

(72) Inventor: Arnold Marquez, Seattle, WA (US)

( * ) Notice: Subject to any disclaimer, the term of this patent is extended or adjusted under 35 U.S.C. 154(b) by 0 days.

(21) Appl. No.: 14/686,656

(22) Filed: Apr. 14, 2015

(51) Int. Cl.
- *B62K 5/06* (2006.01)
- *B62K 21/04* (2006.01)
- *B62M 1/36* (2013.01)
- *B62K 21/02* (2006.01)
- *B62K 5/02* (2013.01)

(52) U.S. Cl.
CPC .. *B62M 1/36* (2013.01); *B62K 5/02* (2013.01); *B62K 21/02* (2013.01); *B62K 5/06* (2013.01); *B62K 21/04* (2013.01)

(58) Field of Classification Search
CPC ...... B62K 2005/001; B62K 5/02; B62K 5/06; B62K 9/02; B62K 25/04; B62M 1/36
USPC ................. 280/282, 275, 283, 284, 259–261, 280/124.135, 124.142
See application file for complete search history.

(56) References Cited

U.S. PATENT DOCUMENTS

| | | | |
|---|---|---|---|
| 1,309,305 A * | 7/1919 | Scheiner | 180/217 |
| 3,466,059 A * | 9/1969 | Kiernan | 280/261 |
| 3,834,721 A * | 9/1974 | Gobby | 280/7.15 |
| 3,843,145 A * | 10/1974 | Templeton | 280/7.15 |
| 3,913,946 A * | 10/1975 | Valentine et al. | 280/236 |
| 4,003,443 A | 1/1977 | Boughers | |
| 4,453,616 A | 6/1984 | Porter | |
| 4,456,277 A | 6/1984 | Carpenter | |
| 4,478,305 A * | 10/1984 | Martin, II | 180/215 |
| 4,541,501 A | 9/1985 | Kawasaki | |
| 4,887,829 A | 12/1989 | Prince | |
| 4,966,381 A | 10/1990 | Feikema | |
| 5,762,354 A | 6/1998 | Brummer | |
| 5,941,548 A | 8/1999 | Owsen | |
| 6,158,542 A * | 12/2000 | Nolet | 180/206.2 |
| 6,203,043 B1 * | 3/2001 | Lehman | 280/288.1 |

(Continued)

FOREIGN PATENT DOCUMENTS

WO 94/20356 * 9/1994

OTHER PUBLICATIONS

"PR(Telescopic)," retrieved from http://www.power-transmissions.com/universal-joint/pr/pr03.html, on Apr. 7, 2015, 1 page.

(Continued)

*Primary Examiner* — Anne Marie Boehler
(74) *Attorney, Agent, or Firm* — Seed IP Law Group PLLC

(57) ABSTRACT

A three-wheeled self-propelled pedal vehicle with front wheel bicycle steering and independently suspended rear drive wheels. The three-wheeled self-propelled pedal vehicle may include a tubular frame comprising a bicycle front triangle down and seat tube members connected to a longitudinal symmetrical support frame with upper and lower longitudinal chords where the lower longitudinal chord supports a drive mechanism comprising a tractive element drive from a bicycle crank chain ring to a freehub transfer shaft assembly and a separate tractive element between the freehub transfer shaft assembly and an articulating telescoping drive shaft assembly which drives rear wheel axles supported by mirrored independent transverse suspension arms.

26 Claims, 8 Drawing Sheets

(56) References Cited

U.S. PATENT DOCUMENTS

| | | |
|---|---|---|
| D480,665 S | 10/2003 | Gunter et al. |
| 7,063,179 B2 | 6/2006 | Takayanagi et al. |
| 7,762,368 B2 | 7/2010 | Matthies |
| 8,066,089 B2 | 11/2011 | Murad |
| 8,186,698 B2 | 5/2012 | Gunderson |
| 8,262,111 B2 | 9/2012 | Lucas |
| 8,757,341 B2 | 6/2014 | Klieber |
| 8,764,040 B1 | 7/2014 | DeLauter |
| 8,843,273 B2 | 9/2014 | Wesling et al. |
| 8,864,161 B2 | 10/2014 | Baron |

OTHER PUBLICATIONS

Shimano Inc., "DURA-ACE Freehub—FH-9000 10/11-Speed," Specification, Jul. 2012, 1 page.

Shimano Inc., "SORA Front Chainwheel—FC-3503," Specification, May 2012, 1 page.

Shimano Inc., "TIAGRA Cassette Sprocket—CS-4600 10-Speed," Specification, Feb. 2011, 1 page.

* cited by examiner

TRICYCLE APPARATUS WITH REAR INDEPENDENT TRANSVERSE SUSPENSION AND RELATED COMPONENTS

BACKGROUND

1. Technical Field

The present disclosure relates generally to human-powered or self-propelled vehicles, such as bicycles and tricycles and, more specifically, to a human-powered tricycle having rear independent transverse suspension and related components thereof.

2. Description of the Related Art

Various motorized and/or self-propelled tricycle apparatuses are known, which include different types of suspension arrangements, such as, for example, the tricycle apparatuses shown and described in U.S. Pat. No. 4,887,829 to Prince and U.S. Pat. No. 8,066,089 to Murad. Such tricycle apparatuses, however, may suffer from a variety of deficiencies and drawbacks, including, for example, excessive complexity or inferior compatibility or serviceability.

BRIEF SUMMARY

The human-powered tricycles with rear independent transverse suspension and related components described herein provide particularly efficient, robust and serviceable form factors while also providing for a particularly stable and comfortable ride.

At least one embodiment of a human-powered tricycle may be summarized as including: a tricycle frame defining a central plane; a front steering wheel operatively coupled to a front end of the tricycle frame to enable steering of the tricycle; a pedal arrangement coupled to an intermediate portion of the tricycle frame to enable human-powered motion of the tricycle; a pair of independently suspended rear drive wheels coupled to a rear end of the tricycle frame by a corresponding pair of suspension arms that extend transverse to the central plane; and a pair of drive shaft assemblies, each drive shaft assembly operatively coupling a respective one of the rear drive wheels to the pedal arrangement via a plurality of mechanical power transmission components. Each suspension arm may be coupled to the tricycle frame to pivot about a respective pivot axis aligned parallel to the central plane to provide transverse suspension, and each rear drive wheel may be fixedly coupled to a corresponding one of the suspension arms such that a camber of each rear drive wheel changes as the corresponding suspension arm pivots about the respective longitudinal pivot axis during operation.

Each drive shaft assembly may include an extendable drive shaft arrangement (e.g., a telescopic universal joint shaft) that is configured to adjust in length with pivotal movement of the corresponding rear drive wheel. Each extendable drive shaft arrangement may include a first end coupled to a main drive shaft that supports a driven sprocket that is drivable via the pedal arrangement and a second end coupled to the respective one of the rear drive wheels via a respective rear wheel axle assembly to transfer rotational motion of the driven sprocket to the rear drive wheels.

The pair of drive shaft assemblies may be coupled together via a main drive shaft assembly, and the main drive shaft assembly may include a main drive shaft with a first end and a second end opposite the first end, the first end including an external profile comprising an arrangement of splines configured to receive a driven sprocket and internal threads to receive a threaded lock ring to secure the driven sprocket to the first end of the main drive shaft. The arrangement of splines of the first end of the main drive shaft may replicate a shortened portion of a conventional freehub body and the internal threads of the first end may replicate corresponding internal threads of the conventional freehub body. Additionally, each of a first end and a second end of the main drive shaft assembly may be provided with a respective coupling structure for engaging a respective one of the drive shaft assemblies. In some instances, the main drive shaft assembly may include a main drive shaft and a secondary shaft extending through the main drive shaft, and each respective coupling structure may be provided at a respective end of the secondary shaft. The secondary shaft may include extendable shaft components coupled together with a bias element arranged to bias the shaft components towards a retracted configuration.

The human-powered tricycle may further include a transfer shaft assembly supported by the tricycle frame aft of the pedal arrangement. The transfer shaft assembly may support a sprocket cluster on a rider's right side of the tricycle frame and a transfer sprocket on a rider's left side of the tricycle frame. The transfer shaft assembly may include a first end and a second end opposite the first end, the first end including a cog arrangement configured to engage and rotatably support a freehub body, and the second end including an arrangement of splines configured to receive the transfer sprocket and internal threads to receive a threaded lock ring to secure the transfer sprocket to the second end of the transfer shaft assembly. The cog arrangement may replicate a portion of a conventional rear wheel hub configured to mate with a conventional freehub assembly. The arrangement of splines of the second end of the transfer shaft assembly may replicate a shortened portion of a conventional freehub body and the internal threads of the second end may replicate corresponding internal threads of the conventional freehub body.

The human-powered tricycle may further include a drive assembly supported by the tricycle frame aft of the transfer shaft assembly. The drive assembly may include a drive train having a driven sprocket on the rider's left side of the tricycle frame which is coupled to the transfer sprocket on the transfer shaft assembly via a tractive element to enable human-powered rotation of the drive train by the pedal arrangement via the intermediary of the transfer shaft assembly. The drive train may include the drive shaft assemblies and each drive shaft assembly may include a telescopic universal joint shaft having a first end coupled to the driven sprocket and a second end coupled to the respective one of the rear drive wheels to transfer rotational motion of the driven sprocket to the rear drive wheels.

The human-powered tricycle may further include a pair of shock absorbing devices, each shock absorbing device being coupled between the tricycle frame and a respective one of the suspension arms to dampen motion of the suspension arms relative to the tricycle frame. Each shock absorbing device may include a compressible member positioned between the tricycle frame and a respective one of the suspension arms, or a pneumatic or hydraulic shock absorber positioned between the tricycle frame and a respective one of the suspension arms. Dampening characteristics of the shock absorbing devices may be adjustable.

A leading portion of the tricycle frame may include a head tube, down tube, seat tube and bottom bracket shell that collectively resembles a traditional bicycle frame. A trailing portion of the tricycle frame may include at least one longitudinal frame member, a transfer shaft shell to support a transfer shaft assembly for transferring power from the pedal arrangement to the rear drive wheels, and a drive shaft shell to support a drive assembly aft of the transfer shaft assembly to receive power from the pedal arrangement via the intermediary of the transfer shaft assembly. A trailing portion of the tricycle frame may include a suspension support structure including a respective suspension arm pivot aperture on each side of the tricycle frame which defines a longitudinal pivot axis about which the respective suspension arm pivots during operation.

The human-powered tricycle may further include a pair of rear wheel hubs, each rear wheel hub rotatably supported at a distal end of a respective one of the suspension arms to enable rotation of each rear drive wheel via a respective rear wheel axle assembly. Each rear wheel axle assembly may be rotatably supported by a bearing carried by the suspension arm. Each rear wheel hub may be locked to rotate in unison with a rear axle of the rear wheel axle assembly by an adapter component positioned at a distal end of the rear wheel axle assembly. An interior portion of the adapter component may replicate an interior mating portion of a conventional freehub body to mate with a conventional rear wheel hub that is configured to mate with a conventional freehub assembly.

Another embodiment of a human-powered tricycle may be summarized as including a single front steering wheel, a pair of rear drive wheels, a tricycle frame supporting the front steering wheel and the rear drive wheels, the rear drive wheels being supported by the tricycle via independent transverse suspension, and a pedal arrangement coupled to the tricycle frame and operatively coupled to the rear drive wheels to enable human-powered motion of the tricycle via the independently suspended rear drive wheels.

DETAILED DESCRIPTION

In the following description, certain specific details are set forth in order to provide a thorough understanding of various disclosed embodiments. However, one skilled in the relevant art will recognize that embodiments may be practiced without one or more of these specific details. In other instances, well-known devices, structures and techniques associated with bicycles or tricycles, or components thereof, may not be shown or described in detail to avoid unnecessarily obscuring descriptions of the embodiments. For example, embodiments of the human-powered tricycles disclosed herein may include a wide variety of conventional bike parts, including, for example, handlebars, grips, front forks, bottom brackets, crank shafts, chain rings, sprockets, cassettes, chains, pedals, shifters, cables, cable accessories, derailleurs, brake levers, brakes, seats, seat posts, clamps, fenders, lights and other conventional bike components, but are not shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The present disclosure relates generally to human-powered or self-propelled vehicles, and more specifically to a human-powered tricycle having rear independent transverse suspension and related components thereof. Embodiments of the human-powered tricycle with rear independent transverse suspension and related components described herein provide particularly efficient, robust and serviceable form factors while also providing for a particularly stable and comfortable ride.

Figure 1:
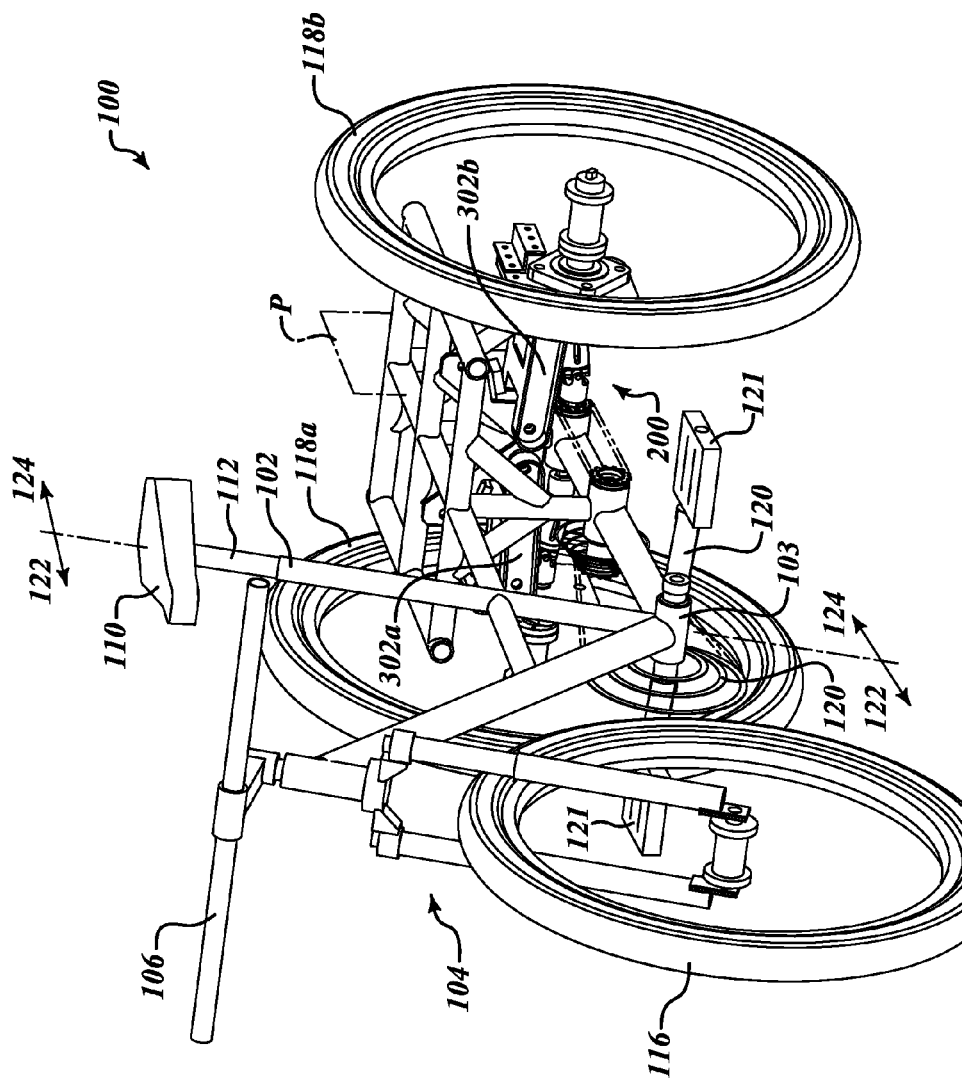
FIG. 1 is a perspective view of a human-powered tricycle including rear independent transverse suspension, according to one example embodiment.

FIGS. 1 through 8 illustrate one example embodiment of a human-powered tricycle 100 and related components thereof. With reference to FIG. 1, the human-powered tricycle 100 includes a tricycle frame 102 comprising bicycle front triangle down and seat tube members connected to a support frame with upper and lower longitudinal chords, which are symmetrically formed about a central plane P. The tricycle frame 102 further includes a bottom bracket shell 103 for receiving a conventional bottom bracket and supporting a conventional crank assembly 120 that is configured for a conventional bicycle, such as, for example, the SORA™ FC-3503 or other cranksets available from Shimano Inc. of Japan.

With continued reference to FIG. 1, a conventional front fork assembly 104 and handle bar assembly 106 may be pivotably coupled to the tricycle frame 102 and attached to a front wheel 116 to provide front wheel bicycle steering functionality. The front fork assembly 104 may include separate or integrated shocks to provide front end shock absorption. The handlebar assembly 106 may include various conventional bicycle controls, such as, for example, a shift lever, a brake lever or a dual control lever. A conventional bike seat 110 may be coupled to the frame 102 by a seat post 112 for accommodating a rider in an upright riding position in which the rider is able to provide self-propelled motion of the tricycle 100 via conventional pedals 121 attached to the crankshaft assembly 120. Accordingly, it will be appreciated that an entirety of a leading end 122 of the example embodiment of the tricycle 100 shown in FIGS. 1 through 8 (i.e., from the seat tube forward) may resemble that of a conventional bicycle.

Figure 2:
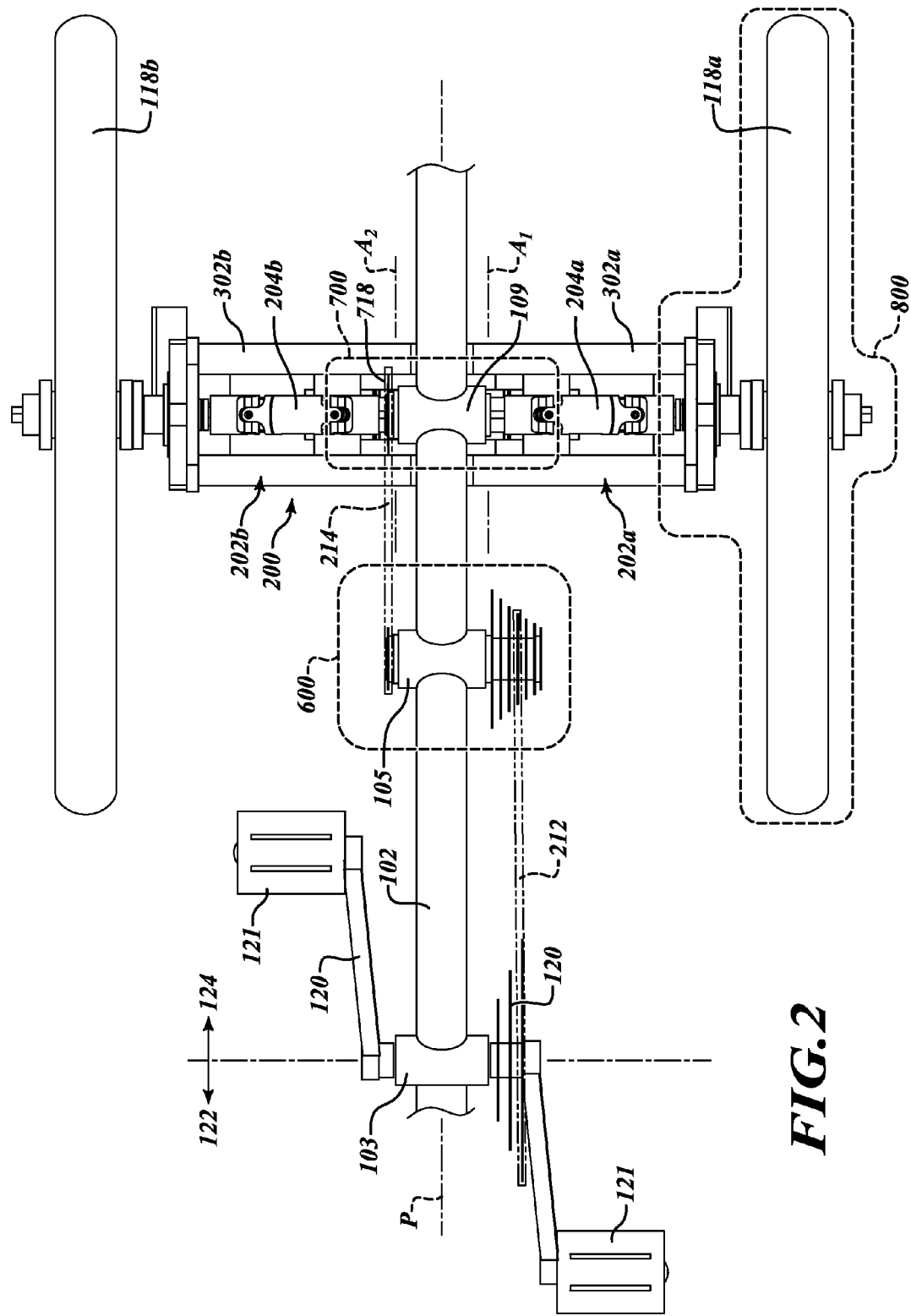
FIG. 2 is a bottom plan view of a portion of the human-powered tricycle of FIG. 1 showing drive train components thereof.

With reference to FIGS. 1 and 2, the human-powered tricycle 100 deviates from a conventional bicycle in that it further includes a pair of independently suspended rear drive wheels 118a, 118b which are coupled to a rear end 124 of the tricycle frame 102 by a corresponding pair of suspension arms 302a, 302b that extend transverse to the central plane P, and which are driven by an articulating telescoping drive shaft assembly 200 operatively coupled to the pedals 121 and crankshaft assembly 120 by various mechanical power transmission components, including a plurality of tractive elements 212, 214 and an intermediate transfer shaft assembly 600 that is received in a transfer shaft shell portion 105 of the tricycle frame 102.

Figure 3:
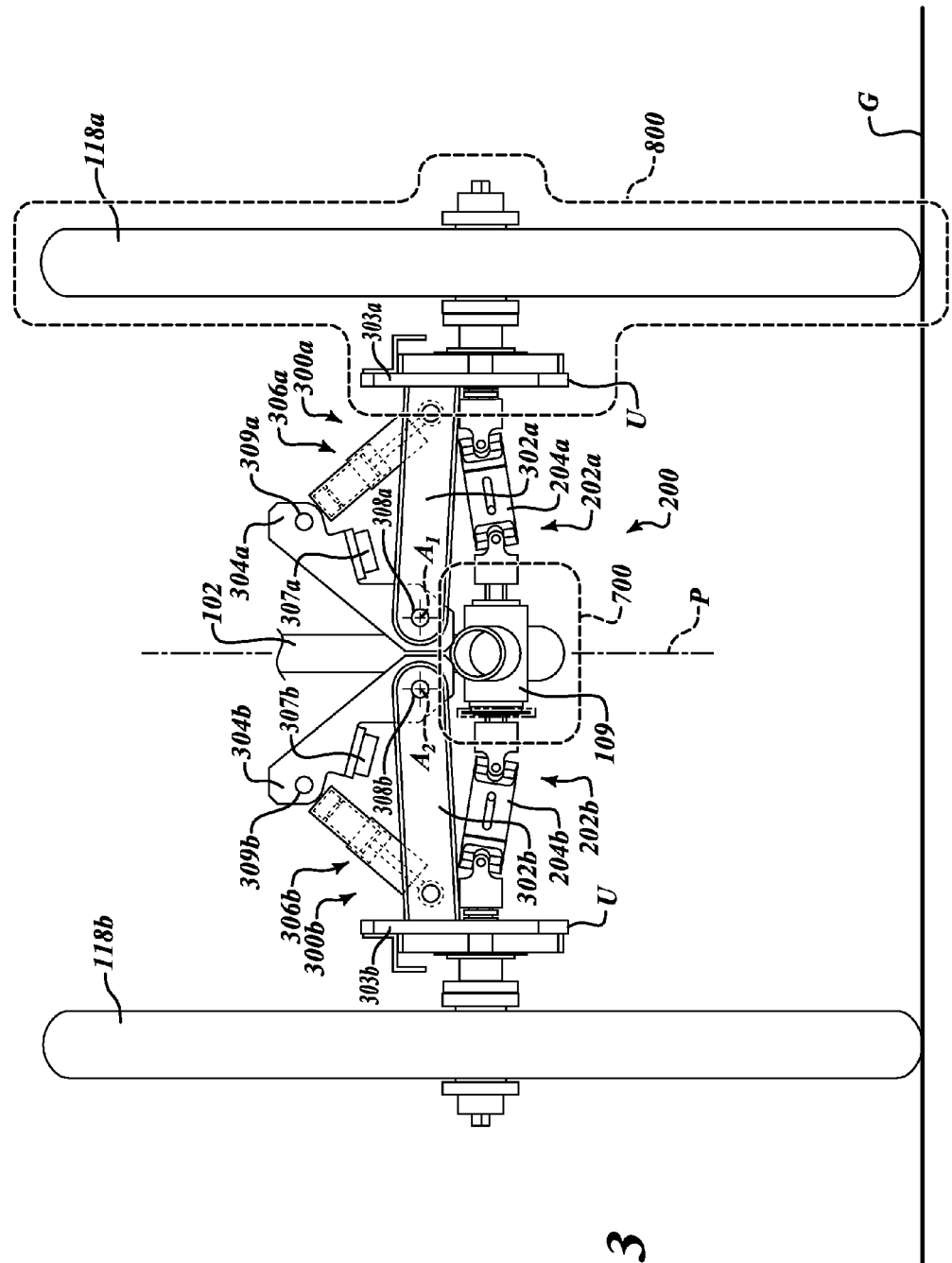
FIG. 3 is a rear elevational view of a portion of the human-powered tricycle of FIG. 1 in an unloaded configuration.
Figure 4:
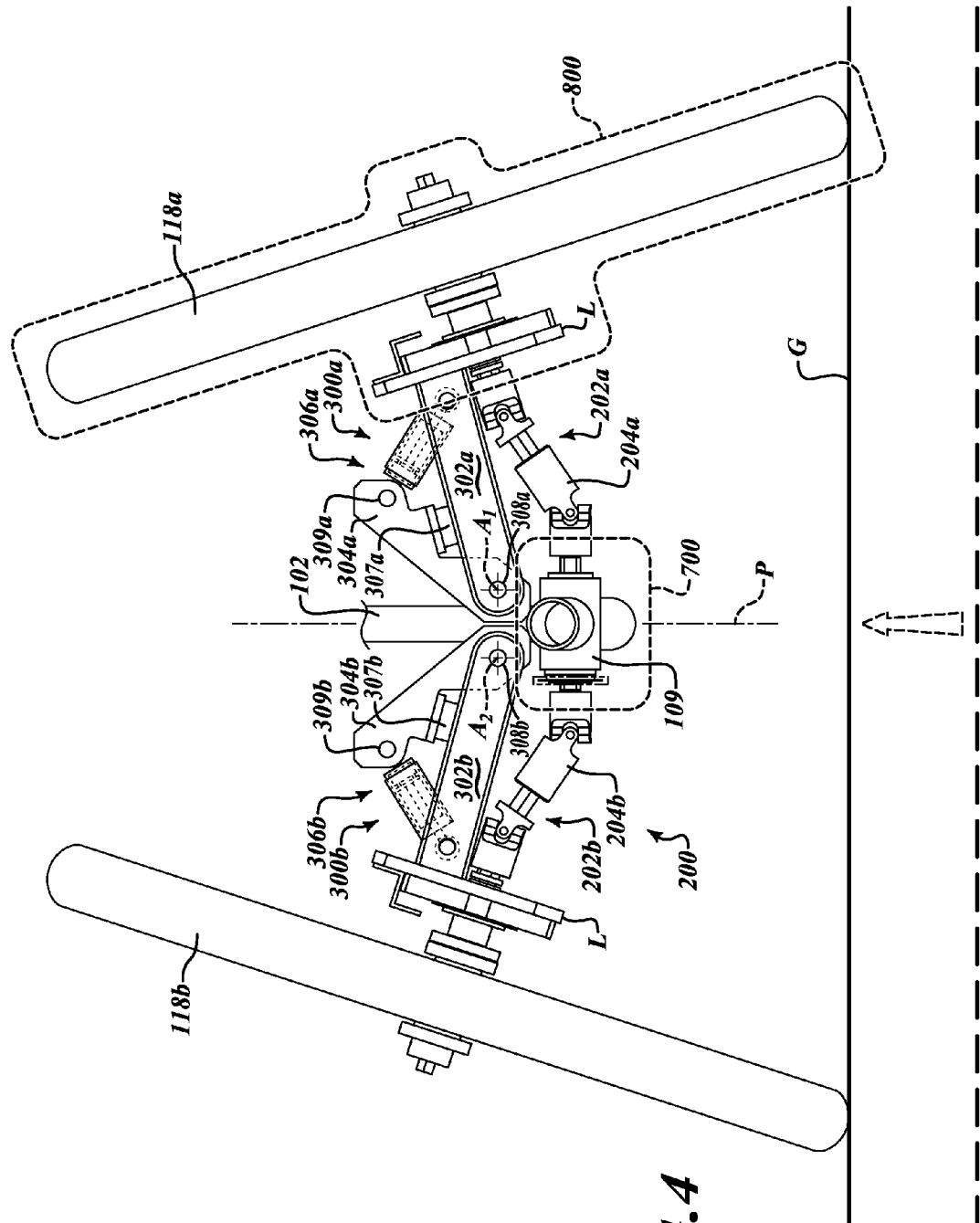
FIG. 4 is a rear elevational view of a portion of the human-powered tricycle of FIG. 1 in a loaded configuration.

With reference to FIGS. 2 through 4, the independently suspended rear drive wheels 118a, 118b are coupled to the rear end 124 of the tricycle frame 102 by a corresponding pair of suspension arms 302a, 302b that extend transverse to the central plane P, and which form part of a right side suspension system 300a and a left side suspension system 300b. Each suspension arm 302a, 302b is coupled to the tricycle frame 102 at suspension arm pivot apertures 308a, 308b to pivot about a respective pivot axis $A_1$, $A_2$ aligned parallel to the central plane P, and each rear drive wheel 118a, 118b is coupled to a corresponding one of the suspension arms 302a, 302b such that a camber of each rear drive wheel 118a, 118b changes as the corresponding suspension arm 302a, 302b pivots about the respective longitudinal pivot axis $A_1$, $A_2$.

With continued reference to FIGS. 2 through 4, the right and left side suspension systems 300a may further include one or more respective shock absorbing devices 306a, 306b (collectively 306) coupled between the tricycle frame 102 and a respective one of the suspension arms 302a, 302b to dampen or otherwise control motion of the suspension arms 302a, 302b relative to the tricycle frame 102. More particularly, and according to the illustrated embodiment, each shock absorbing device 306a, 306b may have a first end coupled to a respective shock absorbing device mounting location 309a, 309b provided on each side of the tricycle frame 102 above and outward of a corresponding suspension arm pivot aperture 308a, 308b located on the same side of the tricycle 100 and a second end coupled to a distal end 303a, 303b of a respective one of the suspension arms 302a, 302b to dampen motion of the suspension arms 302a, 302b relative to the tricycle frame 102 during operation. The shock absorbing device(s) 306 may be in the form of a pneumatic or hydraulic shock absorber 306a, 306b positioned between the tricycle frame 102 and a respective one of the suspension arms 302a, 302b. Additional shock absorbing devices in the form of compressible members 307a, 307b may positioned between the tricycle frame 102 and a respective one of the suspension arms 302a, 302b to supplement or replace the shock absorbing devices 306a, 306b. In some instances, the dampening characteristics of the shock absorbing devices 306 may be adjustable to tune the devices 306 to an individual rider or rider preference.

With reference to FIGS. 3 and 4, the right side suspension system 300a and the left side suspension system 300b are each configured to independently move between an unloaded configuration U, as shown in FIG. 3, and a loaded configuration L, as shown in FIG. 4, in response to external loads. As shown in FIG. 3, each of the right side suspension system 300a and the left side suspension system 300b are shown in the unloaded configuration U with the wheels 118a, 118b at or near a vertical orientation as may be the case when the tricycle 100 is on a flat ground surface G without a rider present. As can be appreciated from FIG. 3, the articulating telescoping drive shaft assembly 200 is in a generally contracted state when both of the right side suspension system 300a and the left side suspension system 300b are in the unloaded configuration U. As shown in FIG. 4, each of the right side suspension system 300a and the left side suspension system 300b are shown in the loaded configuration L with the rear drive wheels 118a, 118b cambered inwardly to a relatively high degree as may be the case when the tricycle 100 is subjected to relatively high external loads during a ride, such as may be the case when landing a jump or in response to abrupt changes to the terrain or ground G upon which the tricycle is operated. As can be appreciated from FIG. 4, the articulating telescoping drive shaft assembly 200 is in a generally extended state when both of the right side suspension system 300a and the left side suspension system 300b are in the loaded configuration L. Although each of the right side suspension system 300a and the left side suspension system 300b are shown in FIGS. 3 and 4 in a similar position, it will be readily apparent to those of ordinary skill in the relevant art that each of the right side suspension system 300a and the left side suspension system 300b may move independently between their respective loaded configuration L and unloaded configuration U to adjust to wide variety of terrain and riding conditions. Damping characteristics of the shock absorbing devices 306 may be selected in accordance with a variety of factors including the type of tricycle (e.g., road trike, mountain trike, city trike), expected riding conditions, rider weight and rider preference to adjust the suspension characteristics of the tricycle 100. Again, in some instances, the dampening characteristics of the shock absorbing devices 306 may be adjustable to tune the devices 306 to an individual rider or rider preference.

In some instances, shock absorbing device(s) may be provided in the form of a compressible member 307a, 307b positioned between the tricycle frame 102 and a respective one of the suspension arms 302a, 302b. For example, as shown in FIGS. 3 and 4, a compressible member 307a, 307b may be provided on each side of the tricycle 100 and attached to a structural extension 304a, 304b of the tricycle frame 102 in a manner to abut or otherwise contact a portion of the suspension arms 302a, 302b as they move into the loaded configuration L, as shown in FIG. 4. As shown best in FIG. 8, the suspension arms 302a, 302b may each include a pair of offset arm members 320 and a cross member 322 that is positioned to engage a respective one of the compressible members 307a, 307b as the suspension arms 302a, 302b move into the loaded configuration L. In some instances, shock absorbing device(s) 306 may be provided in the form of pneumatic or hydraulic shock absorbers 306a, 306b positioned between the tricycle frame 102 and the suspension arms 302a, 302b in addition to or in lieu of the aforementioned compressible members 307a, 307b.

Figure 5:
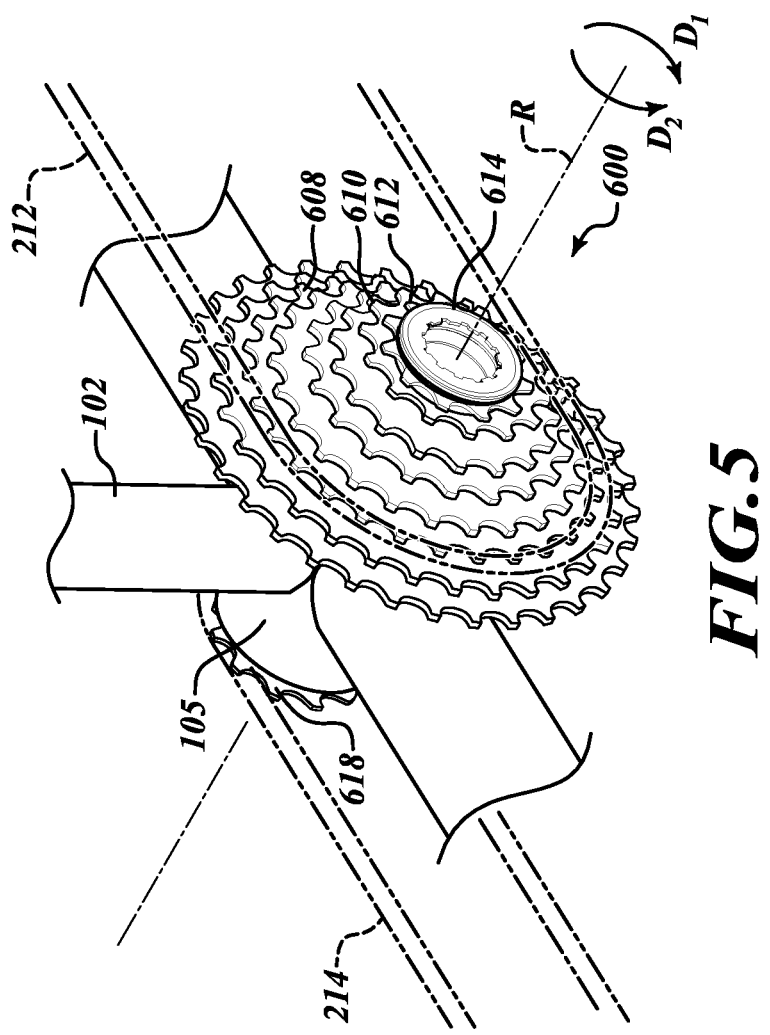
FIG. 5 is an isometric partial view of a transfer shaft assembly of the human-powered tricycle of FIG. 1 shown in a fully assembled state.

FIG. 5 shows the transfer shaft assembly 600 of the human-powered tricycle 100 in a fully assembled condition, which includes a cassette or sprocket cluster 608 and a set of auxiliary sprockets 610, 612 rotationally supported on the rider's right side of the tricycle 100 and an individual transfer sprocket 618 rotationally supported on the rider's left side of the tricycle 100. The cassette or sprocket cluster 608 and set of auxiliary sprockets 610, 612 on the rider's right side is operatively coupled to the crank shaft assembly 120 via a first tractive element 212 (e.g., chain, belt or other tractive element) and the transfer sprocket 618 on the rider's left side is operatively coupled to the articulating telescoping drive shaft assembly 200 (FIGS. 1 through 4) by a second tractive element 214 (e.g., chain, belt or other tractive element). The location of the transfer shaft assembly 600 may approximate a typical rear wheel location of a conventional bicycle. Further details of the transfer shaft assembly 600 and components thereof are shown in the exploded view of FIG. 6.

Figure 6:
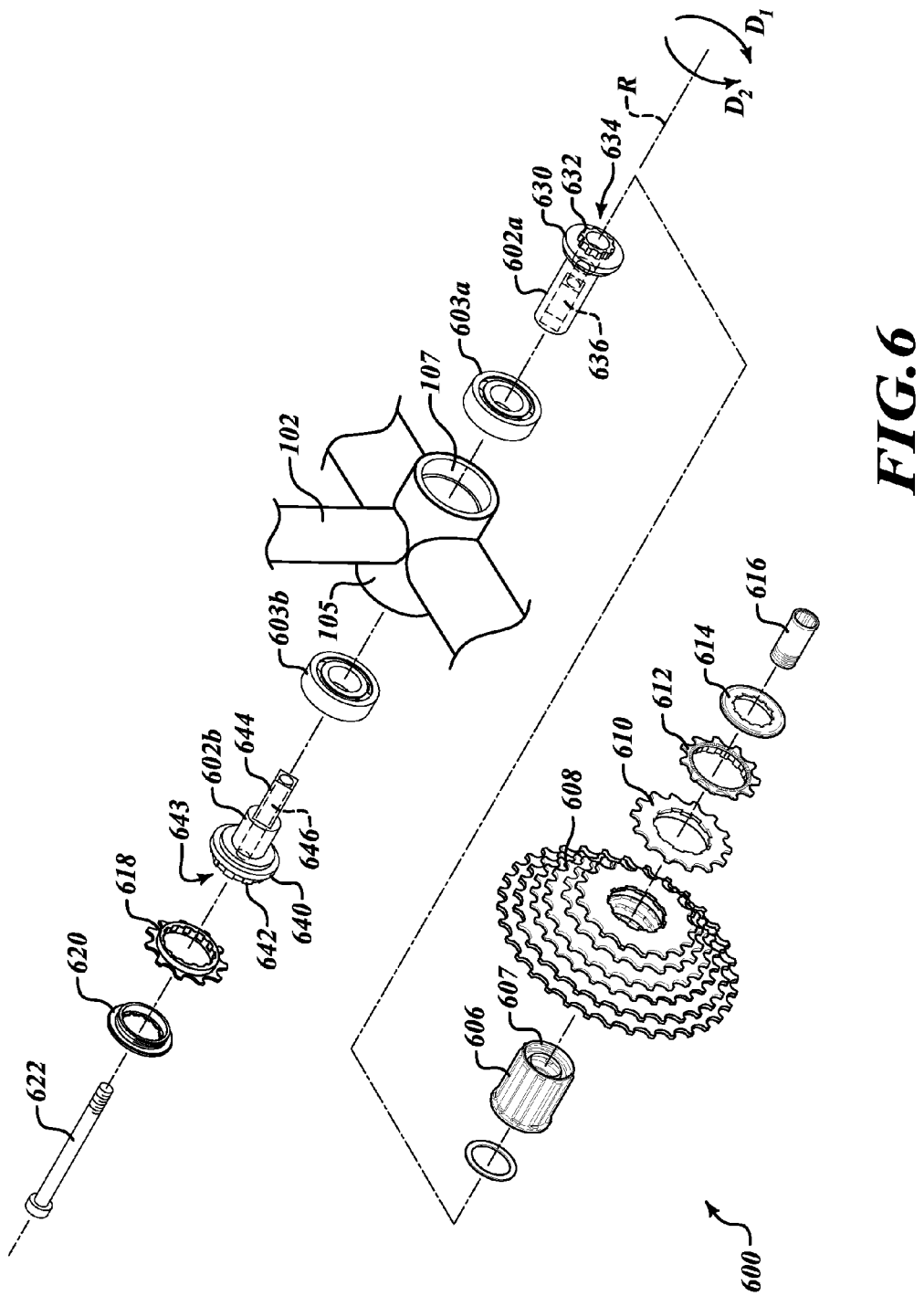
FIG. 6 is an isometric partial exploded view of the transfer shaft assembly of the human-powered tricycle of FIG. 1.

As shown in FIG. 6, the transfer shaft assembly 600 may include a multi-piece transfer shaft 602a, 602b (collectively 602) that is sized and shaped to be received and rotatably supported within the transfer shaft shell portion 105 of the frame 102 by a plurality of bearings 603a, 603b. The bearings 603a, 603b may be, for example, shielded ball bearings and may be press fit into a respective recess 107 of the transfer shaft shell portion 105 or otherwise coupled to or received by the transfer shaft shell portion 105. According to the illustrated embodiment, the transfer shaft 602 may include opposing portions 602a, 602b that include a key 644 and a keyway 636 for interlocking and transferring rotational motion of the rider's right side portion 602a to the rider's left side portion 602b. The opposing portions 602a, 602b of the transfer shaft 602 may be fixed together by one or more fasteners 622 (e.g., a threaded bolt or other fastener) that pass through one or more corresponding apertures 646 in one of the transfer shaft portions 602b and engages internal threads or other coupling features of the other one of the transfer shaft portions 602a. In the case of the illustrated embodiment, the fastener 622 is shown as extending from the rider's left side through the rider's left side transfer shaft portion 602b into the rider's right side transfer shaft portion 602b. Although not shown, a lock device, such as a lock washer or other device, may be provided to assist in maintaining the transfer shaft portions 602a, 602b together. Once fixed together, the transfer shaft portions 602a, 602b effectively operate as a unitary rotational shaft that extends from one side of the tricycle frame 102 to the other.

With continued reference to FIG. 6, one end of the transfer shaft 602, on the rider's right side, is provided with a flange 630 and a cog arrangement 632 that is configured to engage and rotatably support a freehub body 606 (sometimes also referred to as a freewheel body or cassette body). According to the illustrated embodiment, the cog arrangement 632 replicates a portion of a conventional rear wheel hub that is configured to mate with a conventional freehub assembly. For example, the cog arrangement 632 may replicate the rider's right side portion of the rear wheel hub of the DURA-ACE™ Rear Freehub Assembly available from Shimano Inc. of Japan. In this manner, the transfer shaft 602 of the tricycle 100 may be configured to receive a conventional freehub body 606. The freehub body 606 may be fixed to the transfer shaft 602 with a conventional body fixing bolt 616 engaging a threaded aperture 634 provided within the transfer shaft 602. The transfer shaft 602 may therefore advantageously support a wide range of conventional cassettes or sprocket clusters 608 and/or individual sprockets 610, 612 via the freehub body 606. The cassettes or sprocket clusters 608 and/or individual sprockets 610, 612 mate with splines of the freehub body 606 and may be locked into positioned with a lock ring 614 that engages corresponding threads 607 within the freehub body 606. One or more spacers (not shown) may also be provided in connection with the arrangement of sprockets 608, 610, 612. An example cassette 608 suitable for use with embodiments of the transfer shaft assembly 600 described herein includes the TIAGRA™ CS-4600 cassette sprocket assembly available from Shimano Inc. of Japan.

As will be appreciated by one of ordinary skill in the relevant art, a freewheel arrangement (not visible) is provided within the freehub body 606 between it and the cog arrangement 632, which in a first rotational direction $D_1$ about a rotational axis R establishes a coupling between the freehub body 606 and the transfer shaft 602, and in a second rotational direction $D_2$ which is opposite that of the first rotational direction $D_1$, the freehub body 606 is freely rotatable with respect to the transfer shaft 602.

With continued reference to FIG. 6, the other end of the transfer shaft 602, on the rider's left side, is provided with a flange 640 and an arrangement of splines 642 that are configured to receive the aforementioned transfer sprocket 618 for transferring human-powered motion of the crank assembly 120 (FIG. 1) to the articulating telescoping drive shaft assembly 200 via the transfer shaft assembly 600. The end of the transfer shaft 602 on the rider's left side may further include internal threads to receive a threaded lock ring 620 to secure the transfer sprocket 618 to that end of the transfer shaft 602. According to the illustrated embodiment, the arrangement of splines 642 on the rider's left side end of the transfer shaft 602 replicates a shortened portion of a conventional freehub body 606 and internal threads 643 replicate corresponding internal threads 607 of the conventional freehub body 606. In this manner, the transfer sprocket 618 may be provided by a conventional sprocket wheel and may be an exact copy or duplicate of a sprocket wheel 612 rotatably supported by the transfer shaft assembly 600 on the rider's right side of the tricycle 100. Similarly, the threaded lock ring 620 may be an exact copy or duplicate of the lock ring 614 used to retain the arrangement of sprockets 608, 610, 612 on the transfer shaft assembly 600 on the rider's right side of the tricycle 100.

FIGS. 2 through 4 show the articulating telescoping drive shaft assembly 200 in a fully assembled condition. The articulating telescoping drive shaft assembly 200 includes a main drive shaft assembly 700 and a pair of drive shaft sub-assemblies 202a, 202b connected together by the main drive shaft assembly 700. Each drive shaft sub-assembly 202a, 202b is also operatively coupled to a respective one of the rear drive wheels 118a, 118b such that motion from the pedal arrangement (i.e., pedals 121 and crankshaft assembly 120) may be transferred to the rear drive wheels 118a, 118b via a plurality of mechanical power transmission components, including the transfer shaft assembly 600, the main drive shaft assembly 700 and the drive shaft sub-assemblies 202a, 202b. Each drive shaft sub-assembly 202a, 202b may be operatively coupled to a respective one of the rear drive wheels 118a, 118b via a respective rear wheel axle assembly 800 as described in more detail elsewhere with reference to FIG. 8.

With continued reference to FIGS. 2 through 4, each drive shaft sub-assembly 202a, 202b may comprise an extendable drive shaft arrangement 204a, 204b that is configured to adjust in length with pivotal movement of the corresponding rear drive wheel 118a, 118b. For example, each drive shaft sub-assembly may comprise a telescopic universal joint shaft, such as, for example, the PR-Series telescopic universal joint shafts available via www.power-transmissions.com. In such instances, each telescopic universal joint shaft includes a first end coupled to the main drive shaft assembly 700, which supports a driven sprocket 718 that is drivable via the pedal arrangement (i.e., pedals 121 and crankshaft assembly 120) via the transfer shaft assembly 600 and a plurality of tractive elements 212, 214, and a second end coupled to the respective one of the rear drive wheels 118a, 118b via a respective rear wheel axle assembly 800 to transfer rotational motion of the driven sprocket 718 to the rear drive wheels 118a, 118b.

Figure 7:
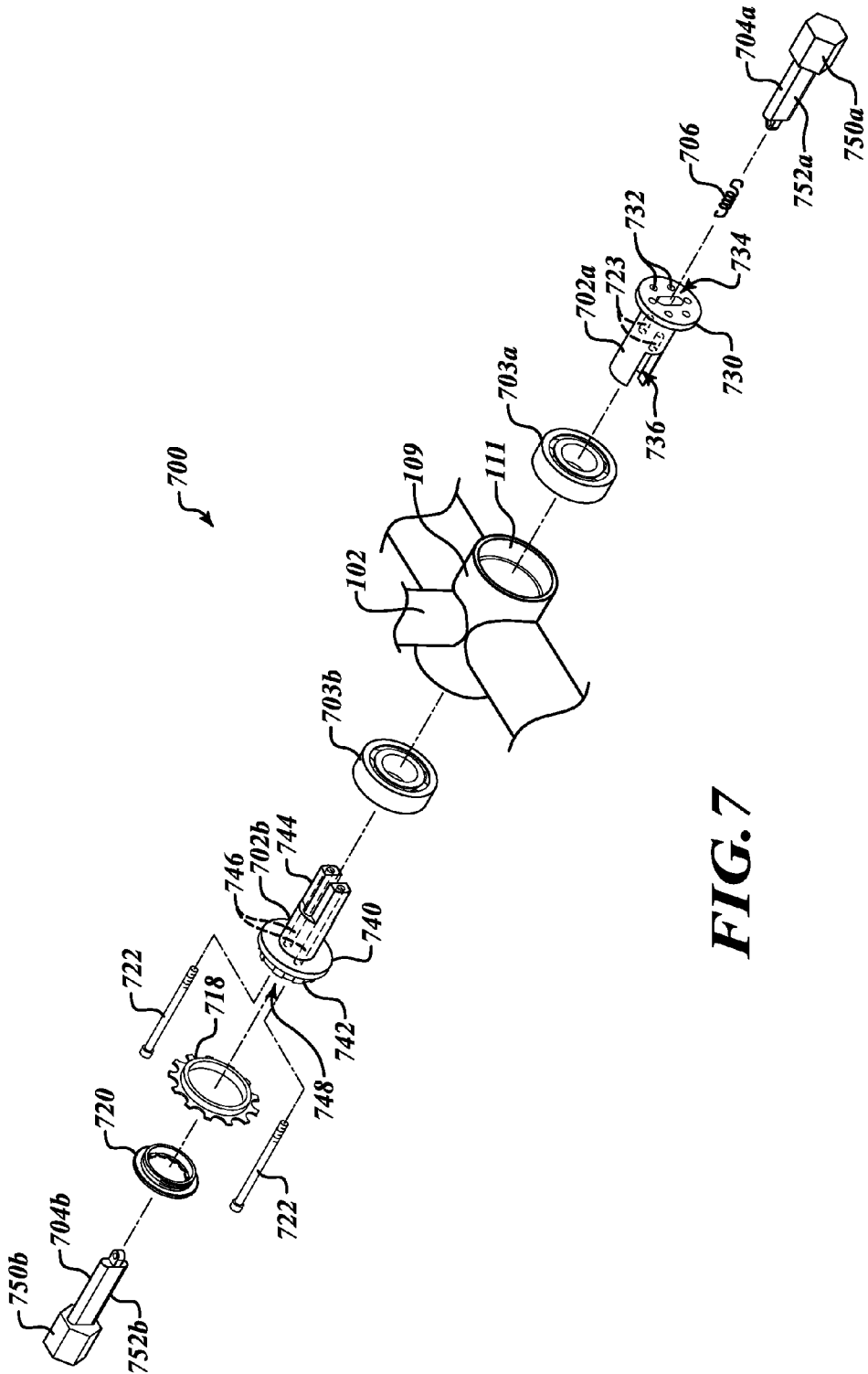
FIG. 7 is an isometric partial exploded view of a main drive shaft assembly of the human-powered tricycle of FIG. 1.

As previously described, the pair of drive shaft sub-assemblies are coupled together via the main drive shaft assembly 700. As shown in FIG. 7, the main drive shaft assembly 700 may include a multi-piece main drive shaft 702a, 702b (collectively 702) that is sized and shaped to be received and rotatably supported within a main shaft shell portion 109 of the frame 102 by a plurality of bearings 703a, 703b. The bearings 703a, 703b may be, for example, shielded ball bearings and may be press fit into a respective recess 111 of the main drive shaft shell portion 109 or otherwise coupled to or received by the main drive shaft shell portion 109. According to the illustrated embodiment, the main drive shaft 702 may include opposing portions 702a, 702b that include one or more keys 744 and one or more keyways 736 for interlocking and transferring rotational motion of the rider's right side portion 702a to the rider's left side portion 702b. The opposing portions 702a, 702b of the main drive shaft 702 may be fixed together by one or more fasteners 722 (e.g., a threaded bolt or other fastener) that pass through one or more corresponding apertures 746 in one of the main drive shaft portions 702b and engages internal threaded apertures 723 or other coupling features of the other one of the main drive shaft portions 702a. In the case of the illustrated embodiment, the fasteners 722 are shown as extending from the rider's left side through the rider's left side main drive shaft portion 702b into corresponding threaded apertures 723 of the rider's right side main drive shaft portion 702a. Although not shown, a lock device, such as a lock washer or other device, may be provided to assist in maintaining the main drive shaft portions 702a, 702b together. Once fixed together, the main drive shaft portions 702a, 702b effectively operate as a unitary rotational shaft that extends from one side of the tricycle frame 102 to the other.

With continued reference to FIG. 7, one end of the main drive shaft 702a, on the rider's right side, is provided with a flange 730 and a mounting arrangement 732 that is configured to receive a brake component. More particularly, according to the illustrated embodiment, the mounting arrangement 732 replicates a portion of a conventional mount for a disc brake rotor, including an array of mounting apertures for mounting the disc brake rotor thereto. In this manner, braking functionality may be provided at a location of the main drive shaft assembly 700 near the central plane P.

The other end of the drive shaft 702b, on the rider's left side, is provided with a flange 740 and an arrangement of splines 742 that are configured to receive the aforementioned driven sprocket 718 for transferring human-powered motion of the crank assembly 120 (FIG. 1) to the articulating telescoping drive shaft assembly 200 via the transfer shaft assembly 600. The end of the drive shaft 702b on the rider's left side may further include internal threads to receive a threaded lock ring 720 to secure the driven sprocket 718 to that end of the main drive shaft 702. According to the illustrated embodiment, the arrangement of splines 742 on the rider's left side end of the main drive shaft 702b replicates a shortened portion of a conventional freehub body 606 (FIG. 6) and the internal threads replicate corresponding internal threads 607 (FIG. 6) of the conventional freehub body 606. In this manner, the driven sprocket 718 may be provided by a conventional sprocket wheel and may be an exact copy or duplicate of the transfer sprocket 618 that is rotatably supported by the transfer shaft assembly 600. Similarly, the threaded lock ring 720 may be an exact copy or duplicate of the lock ring 620 for retaining the transfer sprocket 618 onto the rider's left side of the transfer shaft 602b, as well as the lock ring 614 for retaining the arrangement of sprockets 608, 610, 612 on the rider's right side of the transfer shaft 602a.

With continued reference to FIG. 7, and according to the illustrated embodiment, the main drive shaft assembly 700 may include a main drive shaft 702a, 702b (collectively 702) and a secondary shaft 704a, 704b (collectively 704) extending through corresponding apertures 734, 748 in the main drive shaft 702. A portion or portions 752a, 752b of the secondary shaft 704 extending through the main drive shaft 702 may be size and shaped to engage the main drive shaft 702 and rotate in unison therewith. Opposing ends of the secondary shaft 704 may include coupling structures 750a, 750b for engaging a respective one of the drive shaft sub-assemblies 202a, 202b. For example, opposing ends of the secondary shaft 704 may include hexagonal or other polygonal features for engaging and locking into a respective end of the drive shaft sub-assemblies 202a, 202b. For this purpose, locking rings or other lock devices (not shown) may be provided in connection with the opposing ends of the shaft 704 to retain them in engagement with the drive shaft sub-assemblies 202a, 202b.

According to the illustrated embodiment, the secondary shaft 704 comprises extendable shaft components 704a, 704b that are coupled together with a bias element 706 (e.g., an extension spring) that is arranged to bias the shaft components 704a, 704b towards a retracted configuration (i.e., towards the central plane P of the tricycle). In this manner, the internal shaft 704 may be extended as the suspension arms 302a, 302b pivot toward the loaded configuration L, and may retract as the suspension arms 302a, 302b pivot back toward the unloaded configuration U during operation to provide the suspension system with greater flexibility. In other embodiments, features of the main drive shaft 702 and the internal shaft 704 may be formed as a unitary piece that is not extendable. In such cases, all extension of the articulating telescoping drive shaft assembly 200 may be provided by the drive shaft sub-assemblies 202a, 202b.

Figure 8:
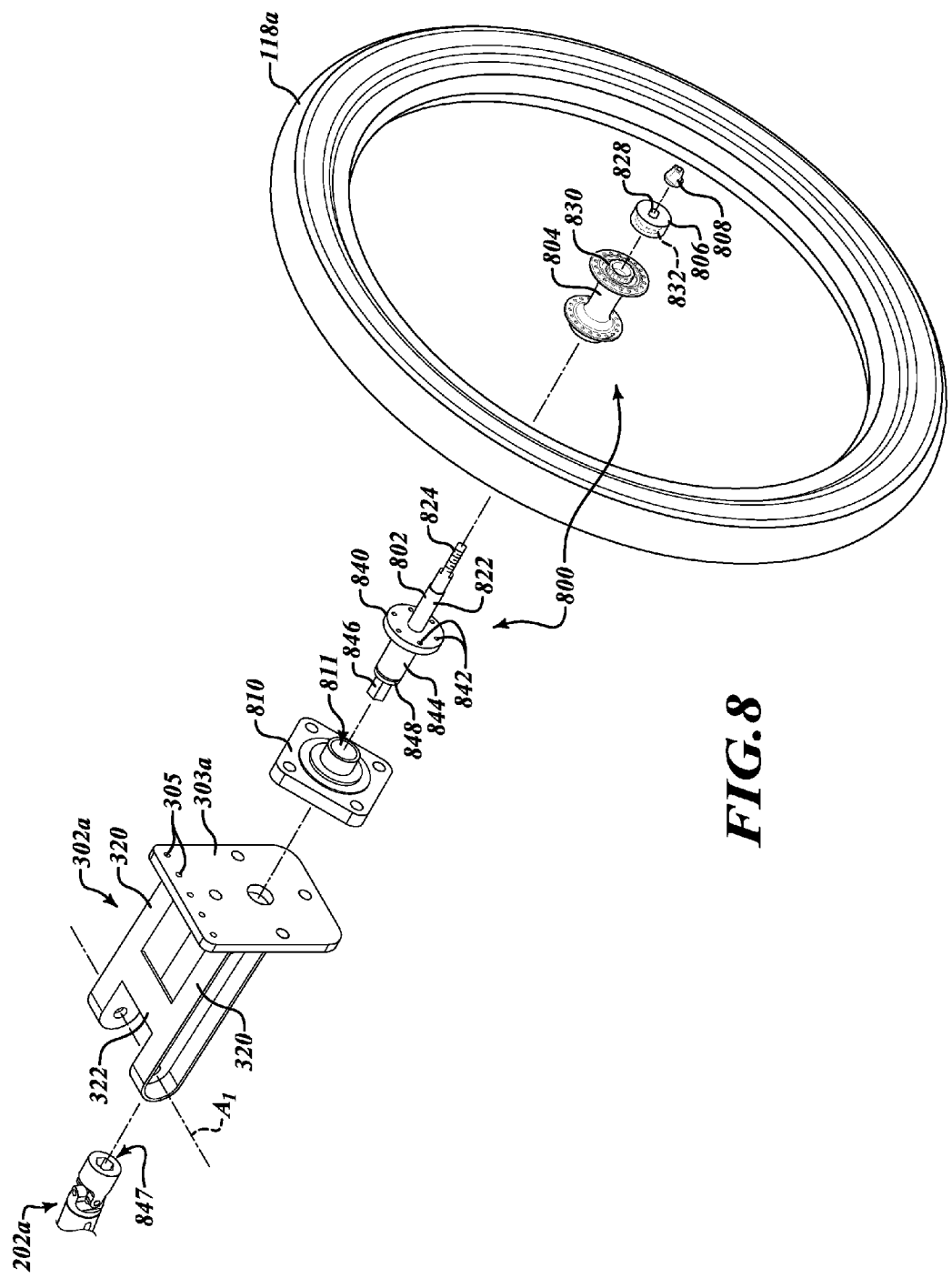
FIG. 8 is an isometric partial exploded view of a right side rear wheel assembly of the human-powered tricycle of FIG. 1.

As previously described, each drive shaft sub-assembly 202a, 202b of the articulating telescoping drive shaft assembly 200 may be operatively coupled to a respective one of the rear drive wheels 118a, 118b via a respective rear wheel axle assembly 800 supported by a respective one of the suspension arms 302a, 302b. FIG. 8 shows the rider's right side rear drive wheel 118a and additional details of the rear wheel axle assembly 800. As can be appreciated from FIG. 8, the rear drive wheel 118a includes a rear wheel hub 804 connected to a rim and tire of the rear drive wheel via spokes (not shown). The rear wheel hub 804 of the rear wheel drive wheel 118a is rotatably supported at a distal end 303a of the suspension arm 302a. More particularly, the rear wheel hub 804 and a corresponding rear wheel axle 802 are rotatably supported by a bearing 810 (e.g., flange mounted ball bearing) carried by the suspension arm 302a. The bearing 810 may be mounted in a housing and secured to the distal end 303a of the suspension arm 302a via fasteners (not shown), or may otherwise be attached directly to the suspension arm 302a, such as, for example, by press-fitting or other techniques. The distal end 303a of the suspension arm 302a may include a mounting arrangement 305 for accommodating various accessories or functional components that preferably move with the rear drive wheel 118a, such as, for example, a disc brake caliper.

With continued reference to FIG. 8, the rear wheel axle 802 may be a unitary shaft with a variety of features formed therein. The rear wheel axle 802 may include, for example, a primary shaft portion 822 that is sized and shaped to be insertably received in the rear wheel hub 804. The rear wheel hub 804 may be or may resemble a conventional rear wheel hub, such as, for example, the hub of the DURA-ACE™ Rear Freehub Assembly available from Shimano Inc. of Japan. A distal end 824 of the primary shaft 822 may be keyed and threaded such that the rear wheel hub 804 can be locked to rotate in unison with rear wheel axle 802 via an adaptor component 806 positioned at a distal end of the rear wheel axle assembly 800. For this purpose, the adapter component 806 may include a keyway 828 to receive the distal end 824 of the primary shaft 822, and an interior portion 832 of the adapter component 806 may replicate an interior mating portion of a conventional freehub body 606 (FIG. 6) so as to mate with a corresponding mating feature 830 of the rear wheel hub 804 (which is otherwise designed to mate with a freehub body 606 of a conventional freehub assembly). A threaded lock nut 808 may engage the threads of the distal end 824 of the primary shaft 822 to lock the hub 804 onto to the rear wheel axle 802. Advantageously, users may therefore utilize existing rear wheels for bicycles with the tricycles 100 described herein.

The rear wheel axle 802 may further include a secondary shaft portion 844 that is sized and shaped to be rotatably supported within a cavity 811 of the aforementioned bearing 810. An end of the secondary shaft portion 844 may include a coupling structure 846, such as, for example, a hexagonal or other polygonal structure for engaging a corresponding coupling feature 847 of the drive shaft sub-assembly 202a such that rotational motion of the articulating telescoping drive shaft assembly 200 is imparted to the rear wheel axle 802 and ultimately to the hub 804 of the rear wheel 118a via the locked engagement of the adaptor component 806. The secondary shaft portion 844 may include a groove 848 or other feature for receiving a locking ring (not shown) or other lock device for securing the axle assembly 800 directly or indirectly to the distal end 303a of the suspension arm 302a, such as, for example, by securing the secondary shaft portion 844 from withdrawing from the bearing 810.

The rear wheel axle 802 may further include a flange portion 840 provided between the primary shaft portion 822 and the secondary shaft portion 844 with a mounting arrangement 842 that is configured to receive a brake component. More particularly, according to the illustrated embodiment, the mounting arrangement 842 replicates a portion of a conventional mount for a disc brake rotor, including an array of mounting apertures for mounting the disc brake rotor thereto. A disc brake caliper, brake cables, and other components may be attached to the distal end 303a of the suspension arm 302a to operate with the disc brake rotor, such as via mounting arrangement 305. In this manner, braking functionality may be provided at a location of the rear wheel axle assembly 800 in addition to or in lieu of other braking functionality.

With reference to FIGS. 1 through 4, the leading portion of the tricycle frame 102 may comprise a head tube, down tube, seat tube and bottom bracket shell that collectively resemble a traditional bicycle frame. The trailing portion or rear portion of the tricycle frame 102 may take on a variety of different forms, including the example form illustrated in FIGS. 1 through 4. For example, the trailing portion of the frame 102 may include one or more longitudinal frame members or chords that extend parallel to the central plane P and which may be integrally formed with the leading portion, such as, for example, by welding or other joining techniques. The trailing portion of the frame 102 may further include a transfer shaft shell 105 to support the aforementioned transfer shaft assembly 600 for transferring power from the pedal arrangement (i.e., pedals 121 and crankshaft assembly 120) to the drive shaft assembly 200 to drive the rear drive wheels 118a, 118b. The trailing portion of the frame 102 may further include a drive shaft shell 109 to support the main drive shaft assembly 700 aft of the transfer shaft assembly 600 to receive power from the pedal arrangement (i.e., pedals 121 and crankshaft assembly 120) via the intermediary of the transfer shaft assembly 600. The transfer shaft shell 105 and the drive shaft shell 109 may be integrally formed with a lower longitudinal frame member or chord, such as, for example, by welding techniques, and may form connections or junctions between segments of the longitudinal frame member or chord.

The trailing portion of the tricycle frame 102 may further include one or more suspension support or mounting structures on each side the tricycle frame 102, such as, for example, the angled extension members shown best in FIGS. 3 and 4, which extend upwardly and outwardly from a lower end of the frame 102 near the drive shaft shell 109. The suspension support or mounting structures may each include a respective suspension arm pivot aperture 308a, 308b on each side of the tricycle frame 102 which each define a respective longitudinal pivot axis $A_1$, $A_2$ about which the suspension arms 302a, 302b independently pivot during operation. The suspension support or mounting structures may further include a respective shock absorbing device mounting location 309a, 309b, such as, for example, a mounting aperture, on each side of the tricycle frame 102 above and outward of the corresponding suspension arm pivot aperture 308a, 308b located on the same side of the tricycle 100 for receiving one end of the aforementioned shock absorbing devices 306a, 306b, when provided, to assist in dampening motion of the suspension arms 302a, 302b relative to the tricycle frame 102 during operation. Other mounting locations for shock absorbing devices in the form of compressible members 307a, 307b or stop members may be provided on the suspension support or mounting structures to position and orient the compressible members 307a, 307b or stop members to interact with a corresponding one the suspension arms 302a, 302b when it independently approaches or reaches the loaded configuration L. The trailing portion of the tricycle frame 102 may further include a rack structure, platform, receptacle or other structural arrangement for carrying equipment, accessories or other devices.

The trailing portion of the tricycle frame 102 and the suspension arms 302a, 302b are designed to resist vertical, lateral and torsional loading conditions arising from typical riding conditions. This may include vertical loading conditions arising from external loads and/or changes in elevation, lateral loading conditions arising from changes in ground resistance and/or terrain (e.g., mud, bumps), and/or torsional loading conditions arising from, for example, simultaneous vertical and lateral loading conditions. In some instances, such as the example embodiment shown in FIGS. 1 through 4, the trailing portion of the tricycle frame 102 may be predominately formed of a collection or arrangement of structural tube members integrally coupled together at junction locations via welding or other joining techniques, and may be integrally formed with the leading portion to form a unitary tricycle frame structure.

Although embodiments of the tricycles 100 described herein are described as including a tricycle frame 102 with a leading portion resembling or replicating a conventional bicycle, it is appreciated that in other embodiments, the leading portion may take on a variety of different forms, including custom frames which may not resemble a traditional bicycle, but which may nevertheless provide a structural foundation for a three-wheeled self-propelled pedal vehicle with front wheel steering and independent rear wheel suspension.

Additionally, it is appreciated that aspects of the various embodiments described above can be combined or modified in view of known devices, structures and techniques associated with bicycles or tricycles, and components thereof, to provide yet further embodiments. For example, although embodiments of the human-powered tricycle are described herein as having rear independent transverse suspension and an articulating telescoping drive shaft assembly, it is appreciated that aspects of the human-powered tricycle and components thereof may be used in connection with a tricycle lacking rear wheel suspension and an articulating telescoping drive shaft assembly altogether. For instance, in lieu of the articulating telescoping drive shaft assembly and suspended drive wheels described herein, a straight fixed length drive shaft assembly may be provided between vertically oriented rear drive wheels lacking suspension, or a fixed length drive shaft assembly with a single respective articulated joint on each side of the tricycle may be provided between cambered rear drive wheels lacking suspension.

Moreover, all of the U.S. patents, U.S. patent application publications, U.S. patent applications, foreign patents, foreign patent applications and non-patent publications referred to in this specification and/or listed in the Application Data Sheetare incorporated herein by reference, in their entirety. Aspects of the embodiments can be modified, if necessary to employ features, structures, functionality or concepts of the various patents, applications and publications to provide still yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A human-powered tricycle comprising:
   a tricycle frame defining a central plane;
   a front steering wheel operatively coupled to a front end of the tricycle frame to enable steering of the tricycle;
   a pedal arrangement coupled to an intermediate portion of the tricycle frame to enable human-powered motion of the tricycle;
   a pair of independently suspended rear drive wheels coupled to a rear end of the tricycle frame by a corresponding pair of suspension arms that extend transverse to the central plane;
   a transfer shaft assembly supported by the tricycle frame aft of the pedal arrangement; and
   a drive shaft assembly operatively coupling the rear drive wheels to the pedal arrangement via a plurality of mechanical power transmission components including a freehub body supported by the transfer shaft assembly, the drive shaft assembly including a pair of drive shaft sub-assemblies coupled together via a main drive shaft assembly, the main drive shaft assembly including a main drive shaft with a first end and a second end opposite the first end, the first end including an external profile comprising an arrangement of splines configured to receive a driven sprocket and internal threads to receive a threaded lock ring to secure the driven sprocket to the first end of the main drive shaft.

2. The human-powered tricycle of claim 1 wherein each drive shaft sub-assembly comprises an extendable drive shaft arrangement that is configured to adjust in length with pivotal movement of the corresponding rear drive wheel.

3. The human-powered tricycle of claim 2 wherein each extendable drive shaft arrangement includes a telescopic universal joint shaft.

4. The human-powered tricycle of claim 3 wherein each telescopic universal joint shaft includes a first end coupled to a main drive shaft that supports a driven sprocket that is drivable via the pedal arrangement and a second end coupled to the respective one of the rear drive wheels via a respective rear wheel axle assembly to transfer rotational motion of the driven sprocket to the rear drive wheels.

5. The human-powered tricycle of claim 1 wherein each of a first end and a second end of the main drive shaft assembly is provided with a respective coupling structure for engaging a respective one of the drive shaft sub-assemblies.

6. The human-powered tricycle of claim 5 wherein the main drive shaft assembly includes a secondary shaft extending through the main drive shaft, and wherein each respective coupling structure is provided at a respective end of the secondary shaft.

7. The human-powered tricycle of claim 6 wherein the secondary shaft comprises extendable shaft components coupled together with a bias element arranged to bias the shaft components towards a retracted configuration.

8. The human-powered tricycle of claim 1 wherein the transfer shaft assembly supports a sprocket cluster on a rider's right side of the tricycle frame and a transfer sprocket on a rider's left side of the tricycle frame.

9. The human-powered tricycle of claim 8 wherein the drive shaft assembly is supported at least in part by the tricycle frame aft of the transfer shaft assembly, the drive assembly including a main drive shaft assembly supporting a driven sprocket on the rider's left side of the tricycle frame which is coupled to the transfer sprocket on the transfer shaft assembly via a tractive element to enable human-powered rotation of the drive shaft assembly by the pedal arrangement via the intermediary of the transfer shaft assembly.

10. The human-powered tricycle of claim 9 wherein the drive shaft assembly includes a pair of drive shaft sub-assemblies and wherein each drive shaft sub-assembly includes a telescopic universal joint shaft having a first end coupled to the main drive shaft assembly upon which the driven sprocket is supported and a second end coupled to the respective one of the rear drive wheels via a respective rear wheel axle assembly to transfer rotational motion of the driven sprocket to the rear drive wheels.

11. The human-powered tricycle of claim 1 wherein each suspension arm is coupled to the tricycle frame to pivot about a respective pivot axis aligned parallel to the central plane.

12. The human-powered tricycle of claim 11 wherein each rear drive wheel is fixedly coupled to a corresponding one of the suspension arms such that a camber of each rear drive wheel changes as the corresponding suspension arm pivots about the respective longitudinal pivot axis.

13. The human-powered tricycle of claim 1, further comprising:
   a pair of shock absorbing devices, each shock absorbing device coupled between the tricycle frame and a respective one of the suspension arms to dampen motion of the suspension arms relative to the tricycle frame.

14. The human-powered tricycle of claim 13 wherein each shock absorbing device comprises a compressible member positioned between the tricycle frame and a respective one of the suspension arms.

15. The human-powered tricycle of claim 13 wherein each shock absorbing device comprises a pneumatic or hydraulic shock absorber positioned between the tricycle frame and a respective one of the suspension arms.

16. The human-powered tricycle of claim 13 wherein dampening characteristics of the shock absorbing devices are adjustable.

17. The human-powered tricycle of claim 1 wherein a leading portion of the tricycle frame comprises a head tube, down tube, seat tube and bottom bracket shell that collectively resemble a traditional bicycle frame.

18. The human-powered tricycle of claim 17 wherein a trailing portion of the tricycle frame comprises at least one longitudinal frame member, a transfer shaft shell to support the transfer shaft assembly for transferring power from the pedal arrangement to the rear drive wheels, and a drive shaft shell to support the drive shaft assembly aft of the transfer shaft assembly to receive power from the pedal arrangement via the intermediary of the transfer shaft assembly.

19. The human-powered tricycle of claim 17 wherein a trailing portion of the tricycle frame comprises a suspension support structure including a respective suspension arm pivot aperture on each side of the tricycle frame which defines a longitudinal pivot axis about which the respective suspension arm pivots during operation.

20. The human-powered tricycle of claim 19, further comprising:
    a pair of shock absorbing devices, each shock absorbing device having a first end coupled to a respective shock absorbing device mounting location provided on each side of the tricycle frame above and outward of the suspension arm pivot aperture of the suspension support structure located on the same side of the tricycle and a second end coupled to a distal end of a respective one of the suspension arms to dampen motion of the suspension arms relative to the tricycle frame during operation.

21. The human-powered tricycle of claim 1, further comprising:
    a pair of rear wheel hubs, each rear wheel hub rotatably supported at a distal end of a respective one of the suspension arms to enable rotation of each rear drive wheel via a respective rear wheel axle assembly.

22. The human-powered tricycle of claim 21 wherein each rear wheel axle assembly is rotatably supported by a respective bearing carried by the suspension arm.

23. The human-powered tricycle of claim 22 wherein each rear wheel hub is locked to rotate in unison with a rear axle of the rear wheel axle assembly by an adapter component positioned at a distal end of the rear wheel axle assembly.

24. The human-powered tricycle of claim 23 wherein an interior portion of the adapter component is configured to mate with a rear wheel hub.

25. A human-powered tricycle comprising:
    a tricycle frame defining a central plane;
    a front steering wheel operatively coupled to a front end of the tricycle frame to enable steering of the tricycle;
    a pedal arrangement coupled to an intermediate portion of the tricycle frame to enable human-powered motion of the tricycle;
    a pair of independently suspended rear drive wheels coupled to a rear end of the tricycle frame by a corresponding pair of suspension arms that extend transverse to the central plane;
    a transfer shaft assembly supported by the tricycle frame aft of the pedal arrangement, the transfer shaft assembly supporting a sprocket clutter on a rider's right side of the tricycle frame and a transfer sprocket on a rider's left side of the tricycle frame, and the transfer shaft assembly including a first end and a second end opposite the first end, the first end comprising a cog arrangement configured to engage and rotatably support a freehub body, and the second end comprising an arrangement of splines configured to receive the transfer sprocket and internal threads to receive a threaded lock ring to secure the transfer sprocket to the second end of the transfer shaft assembly; and
    a drive shaft assembly operatively coupling the rear drive wheels to the pedal arrangement via a plurality of mechanical power transmission components including the freehub body supported by the transfer shaft assembly.

26. The human-powered tricycle of claim 25 wherein the cog arrangement is configured to mate with a freehub assembly.

\* \* \* \* \*